United States Patent [19]

Coate

[11] 4,330,928
[45] May 25, 1982

[54] AUTOMATIC TOOL CHANGER FOR A LATHE

[75] Inventor: William C. Coate, Cincinnati, Ohio

[73] Assignee: The Lodge & Shipley Company, Cincinnati, Ohio

[21] Appl. No.: 93,726

[22] Filed: Nov. 13, 1979

[51] Int. Cl.³ ............................................. B23Q 1/55
[52] U.S. Cl. ....................................... 29/568; 211/1.5
[58] Field of Search ........................... 29/568; 82/2 R

[56] References Cited

U.S. PATENT DOCUMENTS

| | | | |
|---|---|---|---|
| 2,323,010 | 6/1943 | Conradson | 29/568 |
| 2,330,859 | 10/1943 | Bench et al. | 29/26 A |
| 3,186,085 | 6/1965 | Coate | 29/568 |
| 3,186,266 | 6/1965 | Coate | 29/568 |
| 3,300,856 | 1/1967 | Daugherty | 29/568 |
| 3,744,124 | 7/1973 | Gardner | 29/568 |
| 3,789,472 | 2/1974 | Pegard | 29/568 |
| 3,789,500 | 2/1974 | Bondie et al. | 29/568 |
| 3,803,704 | 4/1974 | Seidel | 29/568 |
| 3,807,011 | 4/1974 | Harman et al. | 29/568 |
| 3,846,904 | 12/1974 | Kuhnert | 29/568 |
| 3,867,756 | 2/1975 | Koch et al. | 29/568 |
| 3,925,877 | 12/1975 | Junike et al. | 29/568 |
| 3,947,951 | 4/1976 | Jerue | 29/568 |
| 4,020,545 | 5/1977 | Slavinski et al. | 29/568 |
| 4,087,901 | 5/1978 | Lohneis et al. | 29/568 |
| 4,218,816 | 8/1980 | Dormehl | 29/568 |

FOREIGN PATENT DOCUMENTS

| | | |
|---|---|---|
| 1477429 | 1/1970 | Fed. Rep. of Germany . |
| 2031219 | 1/1971 | Fed. Rep. of Germany . |
| 2656608 | 6/1977 | Fed. Rep. of Germany . |
| 1461992 | 11/1966 | France . |
| 2305273 | 10/1976 | France . |

*Primary Examiner*—Leonidas Vlachos
*Attorney, Agent, or Firm*—Biebel, French & Nauman

[57] ABSTRACT

An automatic tool changer for a lathe is provided having a rotating drum-type tool storage magazine mounted to the cross slide of the lathe and rotatable to align anyone of a plurality of tool holder assemblies and their tools, supported by the magazine, with a guide channel through which a selected tool holder assembly and tool can be slid to the active position, or tool post, on the cross slide, for operating on the workpiece supported by the lathe. A stationary, double-acting, hydraulic piston is disposed in the central portion of the drum-type magazine, having its piston rod in alignment with the guide channel and having a tool holder assembly shuttle member attached to the rod, for transporting an active tool and holder assembly from its ready position in the magazine, in a straight line radially outward from the magazine to the tool post, and for returning the tool holder assembly and tool to their storage position on the magazine after use.

15 Claims, 9 Drawing Figures

AUTOMATIC TOOL CHANGER FOR A LATHE

BACKGROUND OF THE INVENTION

1. Field of the Invention

The present invention relates to an automatic tool changer for a lathe or the like.

2. Prior Art

There are available a variety of devices which provides for selectability of any one of a plurality of tools for operating on a workpiece, for use on lathes and the like. In many of these devices a plurality of tools are carried by a rotating turret supported on the cross slide so that they can be rotated to bring into an active position any one of the tools fixedly secured to the turret. Strictly speaking, this type of device is not a tool changing apparatus in the sense of the present invention, since all of the tools are fixed to the turret and the turret is merely rotated to bring a desired tool into the active position.

However, one type of actual tool changing machine provides a tool magazine at a fixed location on the main stationary frame of the lathe for storing a plurality of tools which can be exchanged with an active tool on the cross slide where a tool is positioned for working on the workpiece. Such devices generally require the cross slide to be moved to a position adjacent the magazine during the transfer of the tools between the magazine and the cross slide, and thus work on the workpiece must be stopped for a substantial period of time to permit this operation to occur.

Still further such equipment provides for a magazine for storing a plurality of tools, to be secured to the cross slide for movement therewith, and also provides for some means of transferring the tools from the magazine to the active position on the cross slide adjacent the workpiece. This latter type of tool changing apparatus is of the general type to which the present invention more closely relates. However, there have been difficulties and disadvantages associated with this type of tool changing equipment in the past. For example, one difficulty is that since the magazine and the transfer apparatus are maintained in close relation to the active position for operation on the workpiece, they are generally prone to contamination in the operating parts of the equipment due to metal chips from the workpiece, and from the coolant used during the cutting operation. This condition can result in difficulties in maintaining the proper alignment of the active tool in the work position due to such contaminant material becoming lodged between the mounting surfaces for the tool holder on the cross slide, which then causes misalignment of the tool with respect to the workpiece, and consequently introduces error into the machining operation.

A further difficulty associated with this latter type of device is that the magazine is mounted to the carriage at a remote location from the workpiece, possibly to reduce the above referred to difficulty. The cross slide must then be moved a substantial distance away from the workpiece to a position adjacent the magazine in order to effect exchange of the tool from the active position, or tool post, on the cross slide to the magazine and vice versa. The cross slide must then be returned to the working position for operation on the workpiece by the newly selected tool, all of which takes a substantial period of time.

SUMMARY OF THE INVENTION

The present invention is an improvement over the above described tool changing apparatus and overcomes the disadvantages and deficiencies thereof. This is accomplished by providing a tool changing magazine and transfer mechanism which is supported on the cross slide, rather than the carriage, for movement therewith and which can rapidly exchange the active tool for a new one without substantially changing the position of the cross slide or carriage adjacent the workpiece, and thus substantially reduces the time required to change tools.

In its preferred form, the magazine of the tool changing apparatus of the present invention is generally cylindrical and rotates about an axis parallel to the axis of rotation of the workpiece, with each of the tools, along with their holders, being removable generally radially outward in a direction perpendicular to and toward, the workpiece axis. At the active position, or tool post, for the tool adjacent the workpiece, a special clamping mechanism is provided to grip with repeatable accuracy the tool holder assembly in exact location relative to the cross slide so that no error is introduced in the positioning of the various tools relative to the workpiece during exchange of tools and their holder assemblies between the magazine and the tool post.

In addition, the transfer mechanism for transferring the tool and holder assembly between the magazine and the active position is simple and uncomplicated and thus is much less susceptible to breakage or malfunction than the much more complicated prior art transfer mechanisms. The transfer mechanism basically consists of a double-acting hydraulic cylinder with a shuttle member secured to the piston rod which moves the selected tool holder assembly and tool between its storage position in the magazine and the active position adjacent the workpiece. The double-acting hydraulic cylinder is disposed stationary within the central region of the magazine and the shuttle member is provided with an arcuate portion of a track which aligns with a similar stationary circular track also in the central region of the magazine which tracks together form a continuous circular track around the interior of the magazine. Rollers on each of the tool holder assemblies ride in this stationary track when the portion of the magazine carrying the tool holder assemblies is being rotated in order to bring a selected tool into registry with the transfer mechanism.

As the tool holder assembly holding the selected tool moves into a ready position in registry with the transfer mechanism, the rollers thereon pass from the track in the magazine to the portion of track on the shuttle member. A hydraulic cylinder then drives the tool holder assembly with the selected tool through a guide channel which leads from the ready position to the active tool position adjacent the workpiece. The magazine then remains in this position during use of the tool. When a new tool is desired, the hydraulic cylinder retracts the tool and tool holder assembly from the active position into its storage position on the magazine. At this point the rollers are aligned with the rest of the track within the magazine so the drum can then be rotated to bring a newly selected tool and holder assembly into the ready position to be engaged by the transfer mechanism.

DETAILED DESCRIPTION OF THE PREFERRED EMBODIMENT

Figure 1:
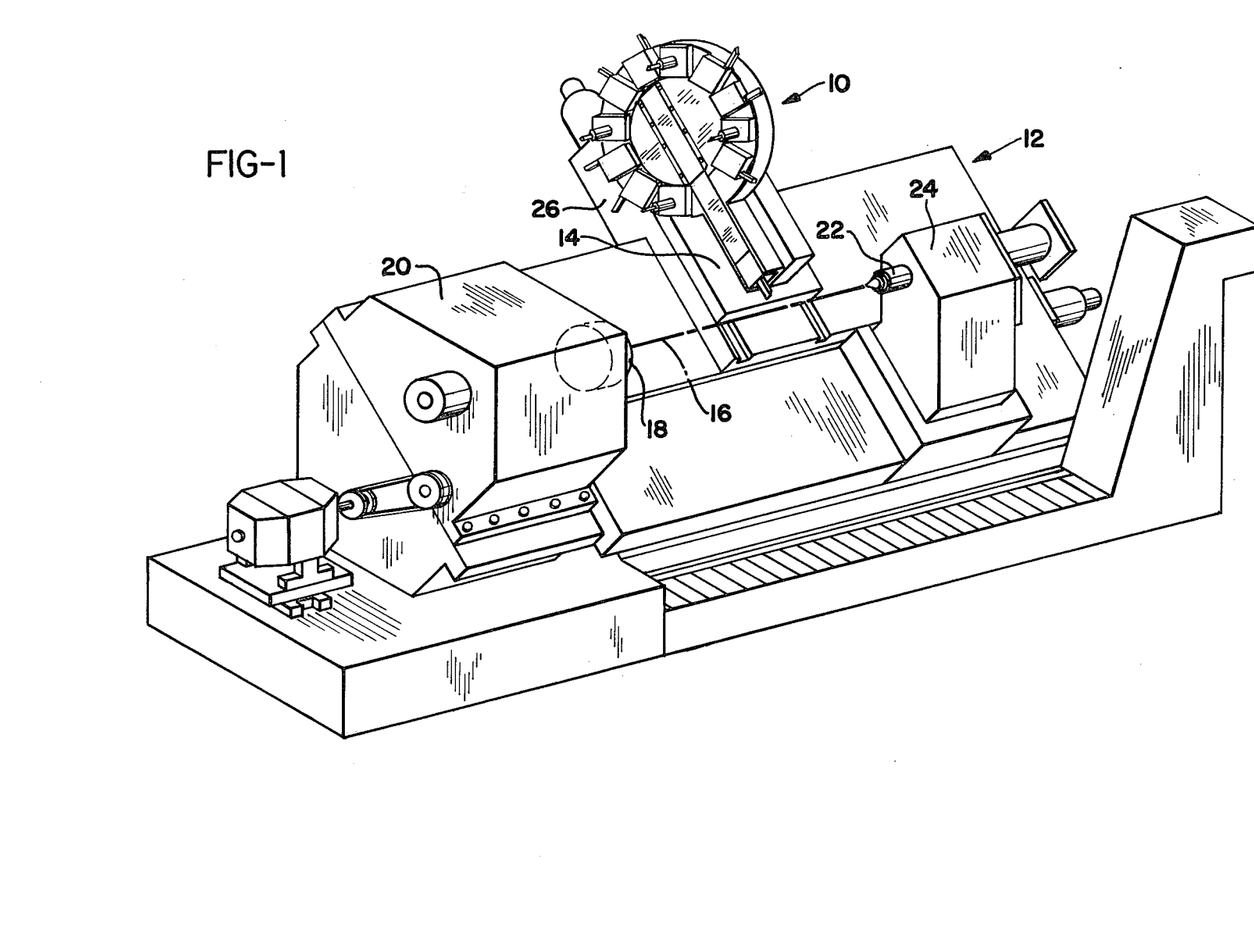
FIG. 1 is a pictorial illustration of the preferred embodiment of the present invention positioned on a lathe drawn schematically with chips and coolant shields and other parts of the lathe removed for clarity.

As illustrated in FIG. 1, the tool changing device of the present invention, shown generally as 10, is designed for use on a lathe 12, although it is to be understood that it could be used on other similar machining devices such as milling machines, etc. The tool changing device 10 is rigidly mounted by bolts 13 (seen in FIG. 2) to the cross slide 14 which moves perpendicular to the axis 16, which is the axis of rotation of a workpiece (not shown). In the embodiment of lathe shown, the workpiece is supported between the chuck 18 on the head stock 20, and the spindle 22 on the tail stock 24. However, it is contemplated that the tool changing device 10 of the present invention can also be used on a "chucker" lathe in which the workpiece is suspended in cantilever fashion from the chuck 18 without the use of the spindle 22 and tail stock 24. The cross slide 14 is supported by the carriage 26 which moves parallel to the axis 16.

The lathe 12 is of generally conventional construction and basically forms no part of the present invention. Operation of the lathe 12 and movements of the cross slide 14 and carriage 26 are automatically controlled through known numerical control techniques for programming a series of movements thereof in order to make the desired cuts on the workpiece. Such numerical control systems are well known in the art and therefore will not be discussed in detail herein. The same numerical control system can be utilized to perform operations of the tool changing device by activating and deactivating the series of switches and hydraulic cylinder motors associated therewith, as described in detail below.

Referring now to the details of the tool changing device 10, and initially with specific reference to FIG. 2, the tool changing device of the present invention includes a drum-type magazine, shown generally as 28, supporting a plurality of tool holder assemblies 30 composed of a plurality of parts described in detail below, and which in turn each hold a tool 32 having any one of a variety of shapes as are conventionally known for different cutting actions, including turning tools and tools for end working such as drills or boring bars (see FIG. 1). A guide channel section, designated generally as 34, extends between the drum-type magazine 28 and an active position or tool post 36 where the active tool holder assembly and associated tool are held in position for cutting the workpiece. The guide channel section 34 provides the guide for movement of a tool holder assembly 30 from the drum-type magazine 28 to the tool post 36. A transfer mechanism, designated generally as 38, is provided for transferring the selected tool holder assembly from its storage position in the magazine 28 to the tool post 36.

Figure 3:
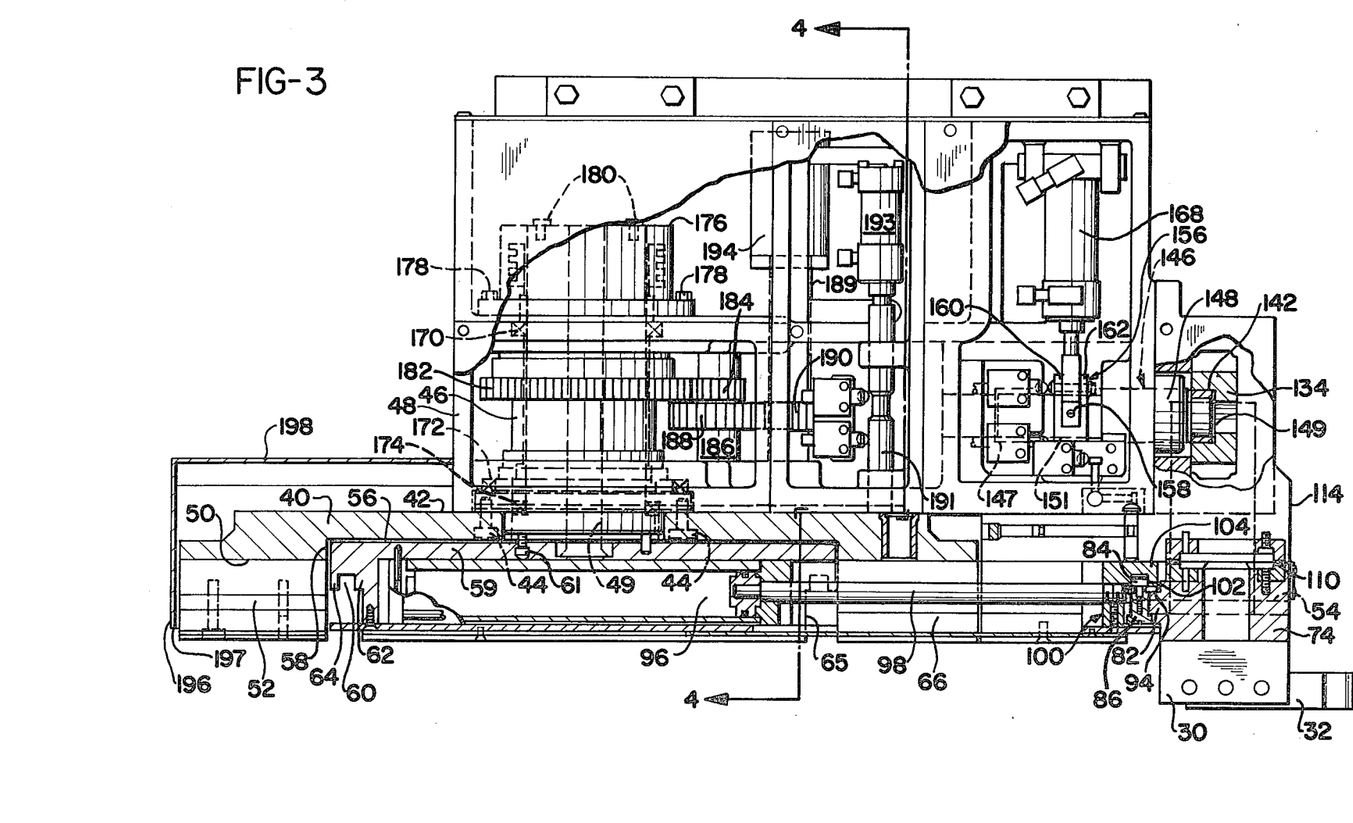
FIG. 3 is a cross sectional view of the preferred embodiment of tool changer along line 3—3 of FIG. 2.

The drum-type magazine 28 includes a generally cylindrical tool holder support frame 40 which is mounted, as shown in FIG. 3, at the back portion 42 thereof by a plurality of bolts 44 to a hollow drive shaft 46 which in turn is rotatably supported in the main frame 48 of the tool changing device 10. The back portion 42 has a circular central opening therein through which a stationary support shaft 49 extends to support the transfer mechanism 38, as described in detail below.

The tool holder support frame 40 is provided with a plurality of channel shaped recesses 50 extending generally radially outward, but offset from and parallel to a radial line through the center of rotation of the frame 40, in order to be in proper alignment with the transfer mechanism 38. The channel shaped recesses 50 are defined on each side by generally triangular shaped blocks 51 secured to the support frame 40. In the preferred embodiment there are 12 such channels 50, evenly spaced around the periphery of the frame 40, and in each of which is stored a tool holder assembly 30. A pair of parallel, rectangular cross-sectioned guide rails 52 are formed in the sides of each channel 50 in blocks 51, which matingly engage corresponding channels 54 formed in the sides of each of the tool holder assemblies 30.

Inboard of the recesses 50 is a large cylindrical cavity defined by the inside surface 56 of back portion 42 and the cylindrical walls 58 of the frame 40, into which cavity each of the recesses 50 opens. Mounted within this cylindrical cavity is a circular, stationary, mounting plate 59 bolted to stationary support shaft 49 by bolts 61, and which supports the transfer mechanism 38 and has formed therein an annular channel 60 defined by inner and outer cylindrical walls 62 and 64, respectively, which extend around the periphery of plate 59 and are continuous except for a portion in line with the guide channel portion 34, where the channel terminates at 65. This presents an opening in the channel 60 coextensive with the width of one of the channel shaped recesses 50 when it is in alignment with the guide channel portion 34 in what will be referred to as the ready position for a tool holder assembly 30 which has been rotated to this location.

The guide channel portion 34 is formed of a channel shaped member 66 having a channel opening defined therein corresponding in dimensions to the channel shaped recesses 50 formed in the tool holder support frame 40 and in parallel alignment with a recess 50 when in the ready position. Member 66 likewise has a pair of guide rails 68 formed in the sides of the channel opening which correspond to the channels 54 in each of the tool holder assemblies 30, so that the tool holder assemblies will be guided during their movement between the magazine 28 and the tool post 36. The channel shaped member 66 terminate at a position slightly less than the width of the tool holder assembly 30 as at 70.

Referring to the construction of the tool holder assemblies 30, they are each provided with a tool holder 72 of generally conventional construction which is provided with a fastening means for holding any one of a variety of tools 32. Each tool holder 72 is fastened in turn to a carrier block 74 which also forms part of the tool holder assembly 30. Each of the tool carrier blocks 74 contains the channels 54 which ride on the guide rails 52 of the frame 40 and guide rails 68 of the channel member 66.

Each carrier block 74 has, in turn, secured along the back surface thereof a locking plate 78, which is also considered a part of the tool holder assembly 30. Locking plate 78 contains a plurality of convex teeth 80 which matingly engage teeth in a corresponding plate in the locking mechanism disposed in the tool post 36, as described in detail below. The teeth 80 are disposed in a circular pattern extending radially outward with diametrically opposed teeth being aligned so as to provide a positive locating system for proper alignment of the tool holder assembly 30 in the tool post position 36.

Figures 4, 5:
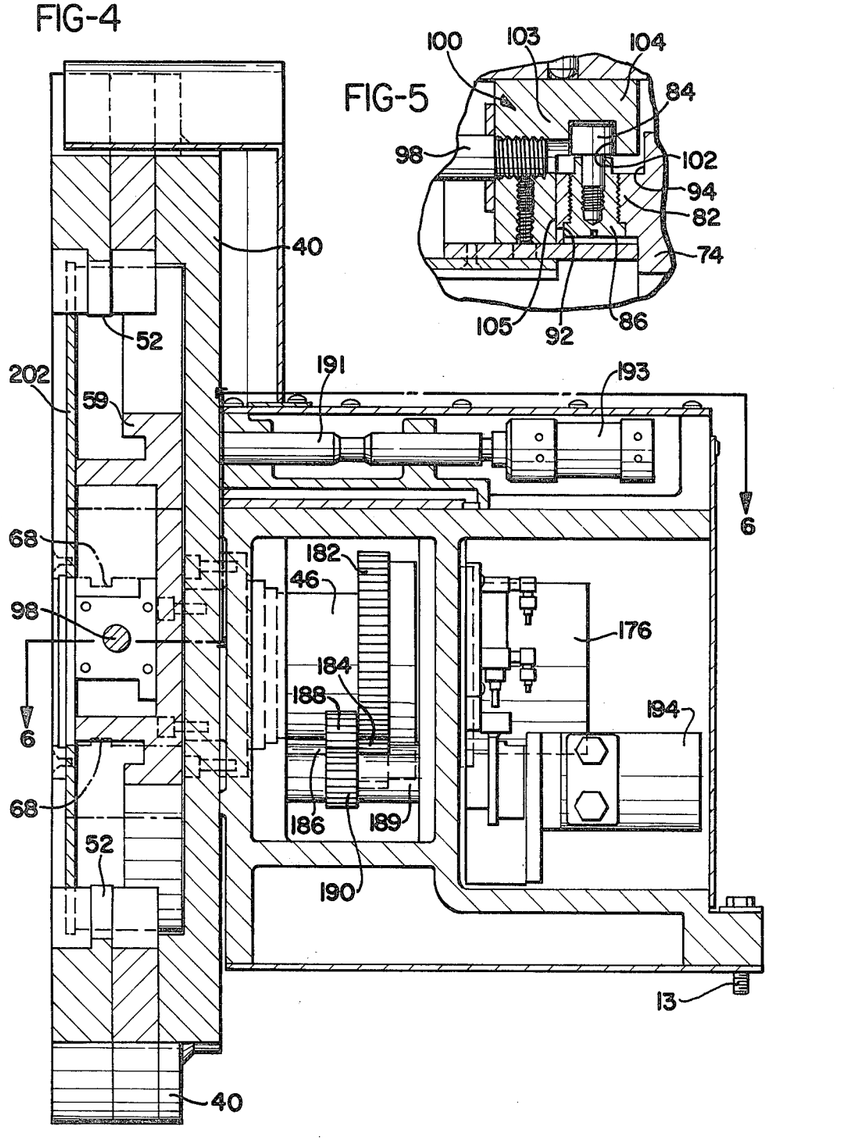
FIG. 4 is a cross sectional view along line 4—4 of FIG. 3.
FIG. 5 is a partial cross sectional view of the shuttle member of the transfer mechanism and the extension portion of a tool carrier block in the tool post position.

The portion of the carrier block 74 which extends inwardly toward the drum magazine 28, when the tool holder assembly 30 is disposed in the tool post position 36, forms an extension 82 which carries a pair of rollers 84 each supported for rotation on one end of a respective cylindrical roller support member 86, which are threaded into correspondingly threaded openings in extension 82 so that the rollers 84 extend through the back side thereof, as shown in FIG. 3. Rollers 84 ride in annular channel 60 in the central cavity of drum-type magazine 28 and also ride in the corresponding annular channel portion of the transfer mechanism 38, described in detail below. Extension 82 of the carrier block 74 has side surfaces 88 and 90, as seen in FIG. 2, which slant inwardly to prevent interference with the corresponding surfaces on adjacent tool holder assemblies 30, when disposed in the drum-type magazine 28. The innermost surface 92 of extension 82 is arcuate and has generally the same radius as the periphery of the inner wall 62 of channel 60, with some clearance provided therebetween to permit rotation of frame 40. The surface 94 on extension 74, as best seen in FIG. 5, has an arcuate shape corresponding to the periphery of outer wall 64 of channel 60 with a clearance provided between the surface 94 and the upper edge of outer wall 64 of the channel member 60 when the tool holder assembly 30 is disposed in the magazine 28, also in order to provide clearance to permit rotation of the frame 40.

The transfer mechanism 38 includes double-acting hydraulic cylinder motor 96 which is secured to the stationary plate 59 and has its piston rod 98 extendable into and parallel with the channel defined in member 66 of the guide channel portion 34. At the outer end of piston rod 98 is secured a tool holder assembly shuttle member 100. Shuttle member 100 has an arcuate channel 102 formed therein by inner and outer walls 103 and 104, respectively, and which channel, when the shuttle member 100 is in the retracted position, is in alignment with channel 60 so as to form a continuous circular channel or track around the inside of a drum-type magazine 28 in which rollers 84 are guided.

The outer wall 104 of shuttle member 100 is arcuate and conforms to the radius of outer wall 64 forming a side of channel 60. The surface 105 is arcuate and matingly engages correspondingly arcuate surface 92, as shown in FIG. 5. The side walls 106 and 108 of shuttle member 100, as seen in FIG. 2, are provided with channels which correspond to guide rails 52 and 68 so as to be guided thereby during movement between the magazine 28 and tool post 36.

Thus, it can be seen that with the shuttle member 100 disposed in the retracted position a pair of rollers 84 associated with a tool holder assembly 30 disposed in the ready position, will be positioned in the channel 102 which will permit the holder assembly to be advanced from the ready position to the active position of the tool post 36, through the guide channel portion 34.

When the tool holder assembly 30 is in the active position, as shown in FIG. 3, the teeth 80 on locking plate 78 are initially in front of and clear of, corresponding teeth 110 in a mating locking plate 112 which is bolted to a portion 114 of the main frame 48 of the tool changing device 10. Teeth 110 comprise a circular pattern of pairs of concave, diametrically opposed teeth 10 which matingly engage corresponding convex teeth 80 on locking plate 78. This type of locking plate is well-known in the art as is illustrated, for example, by U.S. Pat. Nos. 2,384,582; 2,384,583 and 2,384,584. The teeth 80 and 110 are moved into engagement by a coupling mechanism, best illustrated in FIG. 6.

Figure 6:
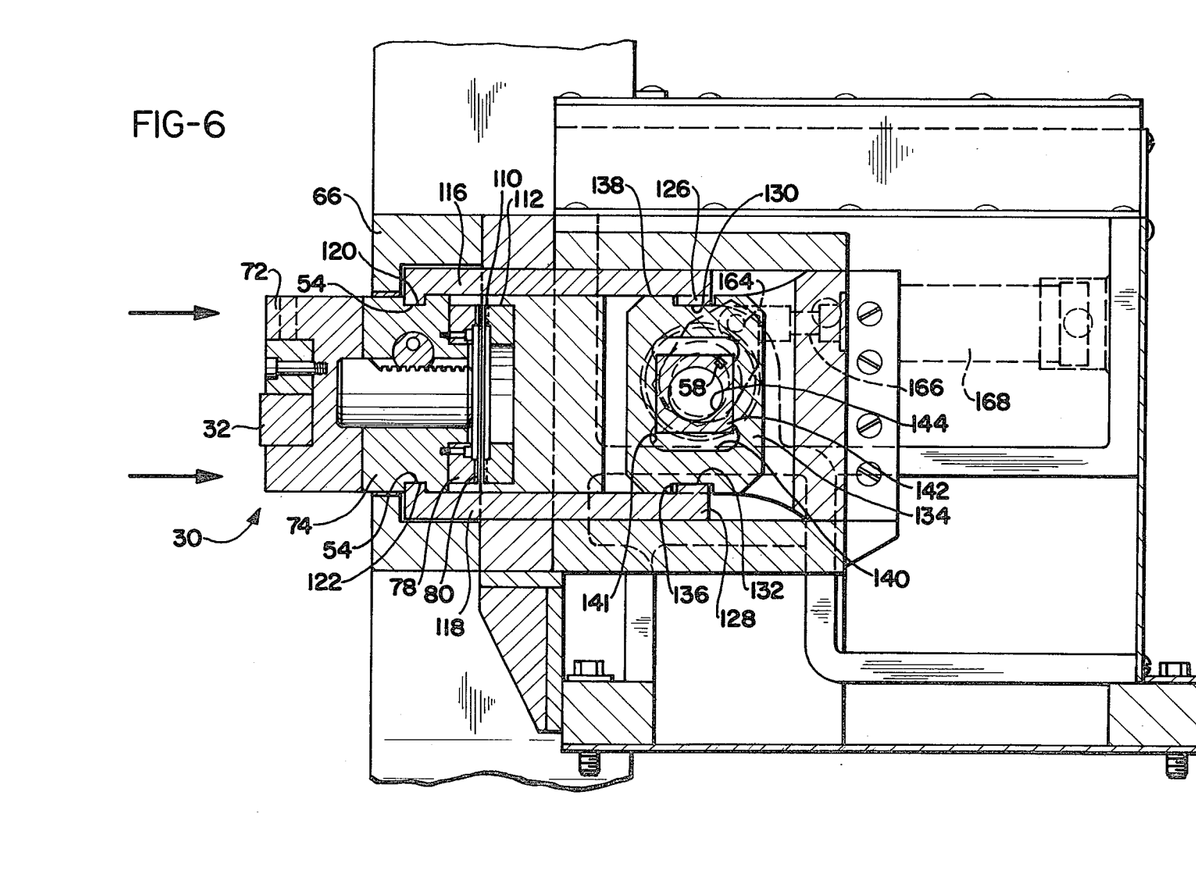
FIG. 6 is a cross sectional view along line 6—6 of FIG. 2 showing the locking mechanism in the tool post portion of the device.

As mentioned above, the tool carrier block 74 is provided with a pair of channels 54 in its upper and lower surfaces, as viewed in FIG. 6, which mate with corresponding guide rails 68 in the guide channel portion 34 of the device. A pair of upper and lower slide members 116 and 118 have lugs 120 and 122, respectively, which mate with channels 54 and are positioned in alignment with guide rails 68 so that as the tool holder assembly is moved from the guide channel portion 34 into the tool post portion 36 the channels 54 bridge the separation between the ends 70 of guide rails 68 and the ends 124 of lugs 120 and 122 before becoming engaged solely by lugs 120 and 122.

Slide members 116 and 118 are supported in the frame portion 114 for parallel, sliding movement back and forth in order to lock the teeth 80 and 110 together so as to firmly hold the tool holder assembly 30 in an exactly repeatable position. The rear portions of slide members 116 and 118 are provided with lugs 126 and 128, respectively, which fit into corresponding channels 130 and 132 formed in a block 134. Block 134 is constrained to reciprocating motion in the direction of slide members 116 and 118 due to contact with lugs 126 and 128 and contact of the front surface portion 136 and 138 of block 134 on the inner surfaces of slide members 116 and 118. Channels 130 and 132 are slightly larger than the lugs 126 and 128 in order to permit a slight amount of play between the slide members 116 and 118, and the block 134 to compensate for some difference in the seating of teeth in locking plates 80 and 110. A generally rectangular opening 140 with enlarged radiused end portions 141 is defined in a portion of block 134 and has positioned therein a corresponding rectangular block 142 for sliding up and down movement, as shown in FIG. 6. The enlarged radiused end portions 141 in rectangular opening 140 permit a slight relative cocking between blocks 134 and 142, also to compensate for some difference in the seating of teeth in locking plates 80 and 110. Block 142, in turn, has a cylindrical opening 144 defined in the center thereof.

As best seen in FIG. 3, a rotatable shaft 146 is mounted in the frame portion 114 in bushings 147 and 148. At one end of shaft 146 is a reduced eccentric portion 149 which is rotatably engaged in block 142 in the opening 144. A further reduced step portion 151 of shaft 146 has mounted thereon a lever arm 156. Lever arm 156 has a cylindrical opening in the center thereof corresponding to the diameter of shaft portion 151 and is fitted to the shaft portion 151 and held in place with a set screw 158 so as to secure the lever arm 156 in position relative to the shaft for rotation therewith. Lever arm 156 has a pair of extensions 160 and 162 to which are mounted, through a pin 164, push rod 166 which is driven by double-acting, hydraulic motor 168.

The eccentric portion 149 of shaft 146 has its center line positioned relative to the center line of the remainder of shaft 146 such that as the shaft is rotated clockwise, as viewed in FIG. 6, block 142 will be moved upwardly and to the left, causing block 134 to slide to the left. Thus, as viewed in FIG. 6, the center line of portion 149 is somewhat downwardly and to the left of the center line of the remainder of shaft 146.

Thus, when the double-acting hydraulic cylinder motor 168 is activated to extend the push rod 166 this will cause shaft 146 to be rotated counterclockwise from the position shown in FIG. 6. Since shaft portion 149 is eccentric to the portion 151 which is supported in the frame portion 114, the shaft portion 149 will be rotated eccentrically causing block 142 to be moved downwardly and to the right, as viewed in FIG. 6, which in turn causes block 134 to be moved to the right, forcing slide members 116 and 118 to the right and thus engaging locking plates 80 and 110. The tool holder is held in this position by the cylinder motor 168 during cutting with the active tool 32. When the cutting operation is over, and prior to withdrawal of the holder assembly 30 from the tool post position 36, cylinder motor 168 is reversed extending the push rod 166 which then releases the coupling between the teeth 80 and 110.

Referring now to the drive mechanism for the drum-type magazine 28 which causes the magazine frame 40 to be rotated in order to bring a specific tool holder assembly 30 into the ready position where it can be transferred to the tool post 36 by the transfer mechanism 38, the hollow drive shaft 46 is supported in the main frame 48 by spaced bearings 170 and 172 and by a further bearing 174 between the interior of the hollow drive shaft 46 and the stationary support shaft 49 which supports the transfer mechanism 38. An end cap 176 surrounds the end portion of both drive shaft 46 and stationary support shaft 49 and is itself bolted by a plurality of bolts 178 to the main frame 48. The support shaft 49, is in turn, bolted to the end cap 176 by a plurality of bolts 180.

Secured around hollow drive shaft 46 is a main drive gear 182 which is driven by pinion gear 184 mounted on shaft 186 for rotation therewith and which shaft is mounted for rotation at its ends in bushings in main frame 48. Also secured to shaft 186 for rotation therewith is intermediate gear 188 which engages a further pinion gear 190 supported for rotation by drive shaft 189. Drive shaft 189 is supported for rotation through bushings in the main frame 48 and is rotated by reversible hydraulic motor 194. The rotation of motor 194, which is preferably a hydraulic motor, and the gear ratios of gears 182, 184, 188 and 190, are all predetermined so that for a given number of revolutions of hydraulic motor 194 the position of a selected tool holder assembly 30 can be determined so that it can be aligned with the ready position in order to be displaced from the magazine 28 by the transfer mechanism 38 into the active position for operation on the workpiece.

For example, the gearing can be established such that for one revolution of the hydraulic motor 194 and twelve available tool holder assemblies 30, the magazine 28 can be rotated 1/12 of a revolution and thus for each revolution of hydraulic motor 194 a new tool holder assembly would be aligned with the ready position.

Figure 7:
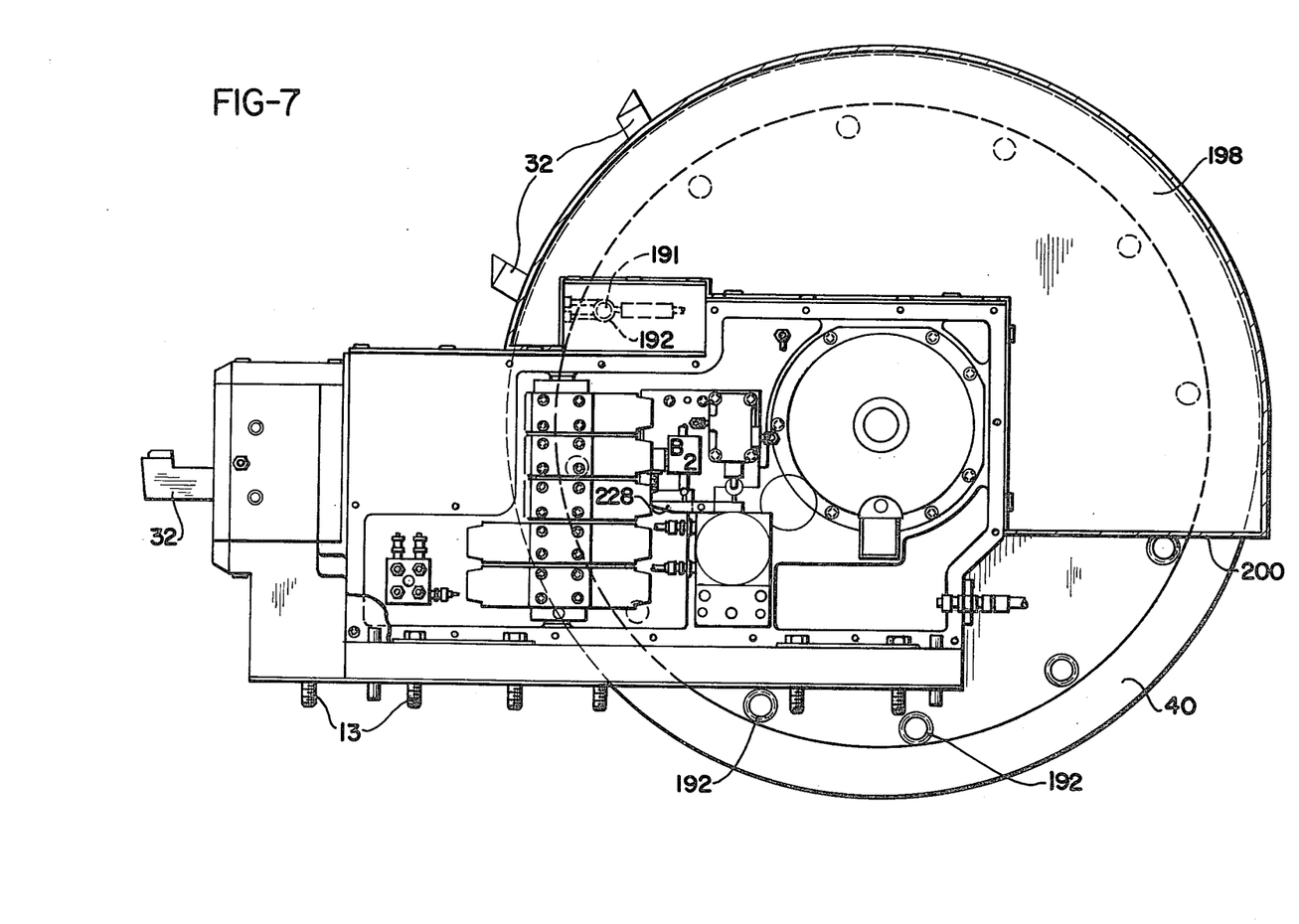
FIG. 7 is a rear elevational view of the preferred embodiment.

Once the selected tool holder assembly 30 has been moved into the ready position in line with the tool post position 36, a locating pin 191 is inserted in a corresponding, cylindrical hole 192 formed in the back portion 42 of frame 40. A plurality of the holes 192 are formed in the back portion 42, as best seen in FIG. 7, which are each aligned with a corresponding tool holder assembly storage position on the rotatable magazine frame 40 so that as the individual position is brought into alignment with the guide portion 34 the locating pin can be inserted in the corresponding hole 192 to accurately locate the tool holder assembly and rotatable magazine frame relative to the guide portion 34. Locating pin 191 is connected to the piston rod of a double-acting, hydraulic cylinder motor 193, which inserts and retracts the pin 191 from the hole 192.

The tool changing device 10 includes a protective housing which covers most of the device to prevent contamination of the guideways and other operative portions of the device in order to prevent them from becoming contaminated with metal filings from the workpiece or by the cutting lubricant during operation of the lathe. Such contamination can be detrimental to the function of the device and cause misalignment of the active tool in its active position so as to cause errors in the cuts being made on the workpiece. The protective housing includes a semi-cylindrical strip 196 which extends around the drum-type magazine 28 with its leading edge 197 coming just behind the position of the tools 32 and over covering a major portion of the outside of the tool holder assemblies 30 and frame 40. The strip 196 is welded to or formed as part of a further backing plate 198 which is mounted behind the frame 40 of magazine 28 and is secured to the main frame 48, as best shown in FIG. 7. A bottom plate 200 extends from the backing plate 198 inwardly towards the back of frame 40 of the magazine 28 and is connected at its ends to the cylindrical strip 198, and to the main frame 48.

Figure 2:
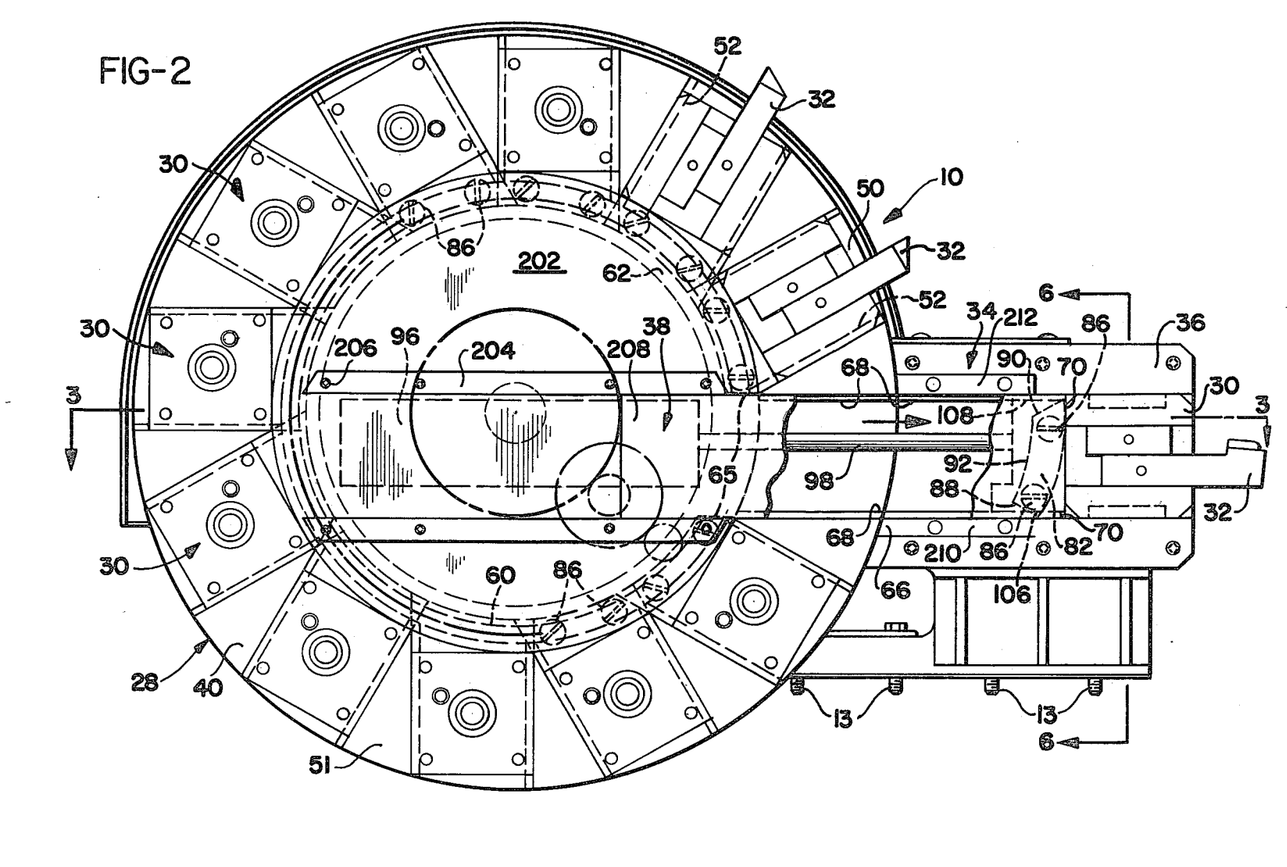
FIG. 2 is a front elevational view (looking from the left as positioned on the lathe in FIG. 1) of the tool changer of the preferred embodiment of the present invention.

Overlying the stationary support plate and the transfer mechanism 38 is a circular plate 202 which, as seen in FIG. 2, has its outer periphery immediately adjacent the interior cylindrical surfaces formed by frame 40 and tool holder assemblies 30, so as to provide only a clearance for movement therebetween while otherwise providing protective cover for the interior of the magazine. A rectangular opening is defined in plate 202 in the vicinity of the shuttle item 100 to permit the fixing of the forward edge of plate 200 to the shuttle item 100. A sliding rectangular plate 208 is mounted between guideways plate 202 and in corresponding guideways in the guide channel portion 34 formed by cover plates 210 and 212 bolted to the top of channel member 66. The forward edge of plate 208 is bolted to the tool holder assembly shuttle member 100 and moves with the shuttle member between the ready position and the active position so that when in the active position the plate 208 covers the opening from the forward edge of plate 204 to the back of tool holder assembly 30 during operation on the workpiece, thus preventing any contaminant material from possibly entering the channel defined in member 66.

This concludes discussion of the various components of the tool changing device 10 with the exception of the hydraulic control system which is discussed in detail below in connection with the operation of the device. The tool changing device 10 is preferably operated in a specific sequence of steps which are basically as follows:

1. traverse the carriage and cross slide sufficiently to clear the tool from the workpiece,
2. unclamp the tool holder assembly from the tool post,
3. retract the shuttle member carrying the tool holder assembly from the tool post to the magazine,
4. withdraw the magazine locating pin,
5. rotate the magazine to bring the newly selected tool to the ready position,
6. insert the magazine locating pin,
7. extend the shuttle member carrying the newly selected tool holder assembly from the magazine to the tool post,
8. clamp the tool holder assembly in the tool post, and
9. traverse the carriage and cross slide to the workpiece to begin cutting.

This sequence of operation is controlled through the numerical control equipment, referred to above, which forms no part of the present invention and can be programmed to accomplish this sequence of events by operating upon the following described hydraulic system which operates the various components of the tool changing device of the present invention.

Figure 8A:
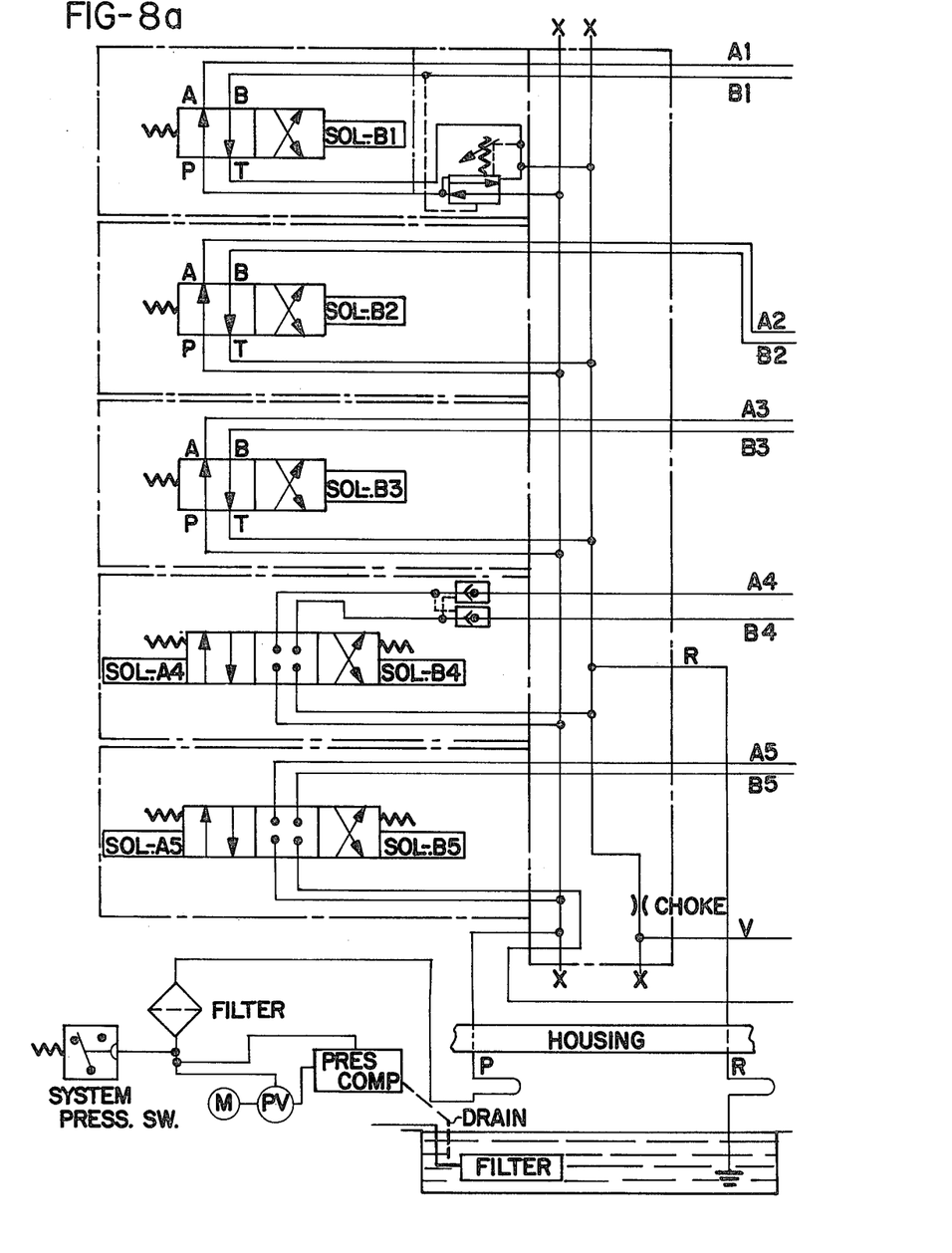
FIGS. 8a and 8b are schematic illustrations of the hydraulic operating equipment for the preferred embodiment of tool changer of the present invention.
Figure 8B:
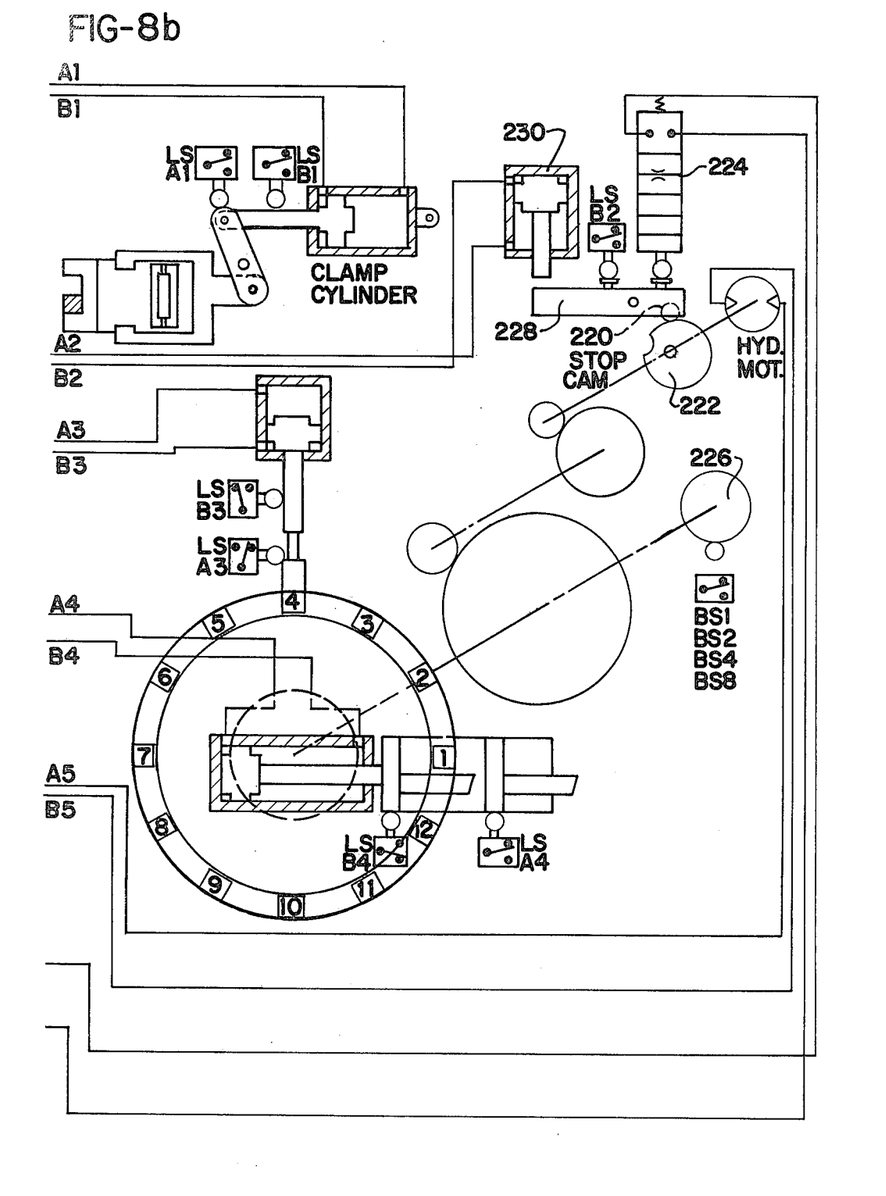

Referring to the sequence of operation, particularly with reference to FIGS. 8a and 8b, the hydraulic circuitry illustrated therein controls movements of the components of the device to effect the desired sequence of movement. Assuming that initially the cross slide has been traversed to clear the workpiece and that the previously used tool is located and clamped in the tool post with the remaining 11 tools in their storage positions in the magazine, the following initial conditions of the various components in the diagram illustrated in FIGS. 8a and 8b are established by the numerical control system. Solenoid B1 is de-energized, which means that the tool holder assembly is maintained clamped in the tool post. Solenoid B2 is de-energized with the roller 220 at the low point on cam 222 and the throttle valve 224 in the blocked position. Solenoid B3 is de-energized, which means that the magazine locating pin is engaged in the corresponding opening 192 in the back of the magazine frame 40. Solenoids A4 and B4 are de-energized, which together block movement of the shuttle member 100. Solenoid A5 and B5 are both de-energized, which prevents rotation of the motor 194 which thus prevents rotation of the magazine frame 40.

Limit switch A1 is closed and limit switch B1 is open, which is indicative of the tool holder assembly being clamped in the tool post position. Limit switch B2 is closed which de-energizes solenoid A5 or B5 and also de-energizes solenoid B2, which together blocks the throttle valve 224 and maintains the magazine frame 40 stationary. Limit switch A3 is closed and limit switch B3 is open, which indicate that the magazine location pin is engaged. Limit switch A4 is closed and limit switch B4 is open, which indicates that the tool holder is at the tool post position. Also, binary switches BS1, BS2, BS4 and BS8 are established according to the numerical control equipment to indicate which tool is presently in the tool post position and which establishes the position of binary cam 226.

The above referred to conditions of the various solenoids and limit switches, as well as the binary switches, are all initial conditions with a given tool being located in the tool position in a clamped condition. The following change in conditions of switches and solenoids illustrates the tool changing sequence to remove the presently active tool from the tool post position and insert a newly selected tool therein for subsequent work on the workpiece.

Initially, the numerical control equipment establishes the binary switch code through binary switches BS1, BS2, BS4 and BS8 for the new selection of tool. In addition, the numeral control circuitry establishes the direction of rotation of the magazine in order to present the shortest path of rotation from the newly selected tool to the ready position, by activating either solenoids A5 or B5 which establishes the direction of rotation of motor 194 and thus the direction of rotation of the magazine 40.

With the tool clear of the workpiece, as stated under the initial conditions, the solenoid B1 is energized to unclamp the tool holder from the tool post which in turn opens limit switch A1 and closes limit switch B1. The close of limit switch B1 in turn energizes solenoid B4, which retracts the shuttle member carrying the tool holder from the tool post to its storage position in the magazine. Movement of the tool holder into the storage position in the magazine in turn opens limit switch A4 and closes limit switch B4. When limit switch B4 is closed, it in turn de-energizes solenoid B4 and energizes solenoid B3 to withdraw the magazine locating pin. Withdrawal of the magazine locating pin opens limit switch A3 and closes limit switch B3.

The closing of limit switch B3 in turn energizes solenoid B2 and energizes either solenoid A5 or solenoid B5 which establishes the direction of rotation of the magazine, as mentioned above. In addition, closing of limit switch B3 lifts roller 220 from cam 222 through the pivoted lever arm 228 by action of the hydraulic cylinder 230. Movement of lever arm 228 in turn opens limit switch B2 and opens throttle valve 224, thus starting rotation of the magazine frame 40.

When the newly selected tool approaches the ready position, the cam 226 activates the correct sequence of binary switches BS1, BS2, BS4 and BS8, for that station, which is electrically compared to the selected station in the numerical control system, this then de-energizes solenoid B2 which returns the roller to the surface of the stop cam 222. The magazine frame 40 then decelerates to a stop as the roller 220 drops into the low point of the stop cam to close limit switch B2. The closing of limit switch B2 de-energizes the active solenoid A5 or B5, which locks the hydraulic motor 194 against further rotation. The closing of limit switch B2 also de-energizes solenoid B3, which inserts the magazine location pin in corresponding hole 192. Then movement of the magazine location pin in turn opens limit switch B3 and closes limit switch A3. The closing of limit switch A3 energizes solenoid A4, which causes extension of the shuttle member and the tool holder assembly from the ready position in the magazine to the tool post. When the holder assembly is in the tool post it opens limit switch B4 and closes limit switch A4.

The closing of limit switch A4 de-energizes solenoid A4 and de-energizes solenoid B1, which clamps the new tool holder assembly in the tool post. The clamping of the tool holder assembly in the tool post opens limit switch B1 and closes limit switch A1. The closing of limit switch A1 signals the end of the tool changing sequence to the numerical control equipment which in turn moves the cross slide and carriage to the workpiece to begin a new cut.

Thus, at this point, all of the solenoids and limit switches are returned to their initial condition, as described above, so that the entire sequence can be restarted when a new tool is needed at the tool post.

Although the foregoing illustrates the preferred embodiment of the present invention, other variations are possible. All such variations as would be obvious to one skilled in this art are intended to be included within the scope of the invention as defined by the following claims.

What is claimed is:

1. A tool changing and supporting apparatus for use on a lathe or the like, having means defining a spindle axis for a workpiece and a cross slide movable parallel to and transversely toward and away from said axis, comprising:
   a plurality of tool holder assemblies each for holding at least one tool;
   a tool post secured to and disposed stationary relative to said cross slide for movement therewith and for holding any one of said tool holder assemblies carrying a tool for operation on said workpiece and including a first locking plate fixedly mounted on said cross slide and having positioning means thereon, each said tool holder assembly having a second locking plate having further positioning means engageable with said first locking plate positioning means, for aligning any one of said tool holder assemblies in a predetermined position in said tool post when said locking plates are mutually engaged; and
   means for urging said one tool holder assembly toward said first locking plate when said one tool holder assembly is in said tool post, including a pair of slide members disposed in spaced parallel relation and mounted in said tool post for sliding movement toward and away from said first locking plate and engageable with corresponding grooves in a tool holder assembly disposed in said tool post for moving said last named tool holder assembly toward and away from said first locking plate, and double-acting hydraulic cylinder means for moving said slide members toward and away from said first locking plate so as to engage and disengage said positioning means;
   a tool magazine for carrying said tool holder assemblies and mounted on said cross slide for movement to bring any one of said tool holder assemblies into a ready position aligned with said tool post, said tool post being spaced from said tool magazine; and
   tool holder assembly transport means having a rod reciprocable along a line between said ready position and said tool post, and having means on said rod engageable with one of said tool holder assemblies when disposed in said ready position for moving said one tool holder assembly between said ready position and said tool post said rod being supported by a further double-acting hydraulic cylinder motor disposed within said magazine in fixed relation to said tool post, and about which said magazine rotates.

2. A tool changing and supporting apparatus as defined in claim 1 wherein said tool magazine is a drum-type magazine mounted on said cross slide for rotation about a fixed axis relative to said cross slide and parallel to said spindle axis, said magazine being rotatable to bring any one of said tool holder assemblies into said ready position.

3. A tool changing and supporting apparatus as defined in claim 1 wherein said positioning means of said first and second locking plates include one of said positioning means having a circular pattern of convex teeth and the other of said positioning means having a circular pattern of concave teeth for matingly engaging said convex teeth.

4. A tool changing and supporting apparatus as defined in claim 3 wherein said slide members are disposed externally of and adjacent said circular patterns of said teeth of said first and second locking plates.

5. A tool changing and supporting apparatus as defined in claim 4 wherein said slide members include lugs which matingly engage corresponding channels formed in said tool holder assemblies for moving said tool holder assembly disposed at said tool post toward and away from said first locking plate.

6. A tool changing and supporting apparatus as defined in claim 5 wherein said tool holder assembly transport means moves said tool holder assemblies along a line perpendicular to said spindle axis and said urging means moves said tool holder assembly at said tool post in a direction parallel to said spindle axis whereby said locking plates interengage.

7. A tool changing and supporting apparatus as defined in claim 6 wherein said lugs on said slide members and said corresponding channels in said tool holder assemblies when at said tool post extend perpendicular to said spindle axis symmetrically and diametrically opposed across said circular teeth patterns on said locking plates.

8. A tool changing and supporting apparatus as defined in claim 7 wherein said lugs are disposed above and below said circular teeth patterns on said locking plates.

9. A tool changing and supporting apparatus as defined in claim 8, including:
   cam means interconnecting said further cylinder means and said slide members for locking said positioning means in engagement during use of a tool.

10. A tool changing and supporting apparatus as defined in claim 9 wherein said slide members have further lugs remote from said first mentioned lugs and said cam means includes:
    a block defining slots for receiving said further lugs and mounted therebetween for sliding reciprocating movement therewith towards and away from said locking plates on an opposite side thereof from said tool holder assembly at said tool post, said slots providing limited independent movement of each said slide member relative to said block to compensate for some difference in seating of said teeth in said locking plates due to misalignment.

11. A tool changing and supporting apparatus as defined in claim 10 wherein said block has a central generally rectangular opening defined therein and a further rectangular block is disposed therein in engagement with side walls in said first mentioned block defining said rectangular opening with said further block being sized for limited reciprocating movement in said rectangular opening perpendicular to said spindle axis, said further block having a cylindrical opening defined therein, and said cam means having a shaft mounted for reciprocating rotation about its longitudinal axis and having an eccentric cylindrical portion engaging said further block in said cylindrical opening thereof for causing reciprocating movement thereof upon rotation of said shaft so as to cause said first mentioned block to move said slide members to selectively engage and disengage said locking plates, and means interconnecting said further hydraulic cylinder means with said shaft for causing reciprocating rotation thereof.

12. A tool changing and supporting apparatus for use on a lathe or the like, having means defining a spindle axis for a workpiece and a cross slide movable parallel to and transversely toward and away from said axis, comprising:

a plurality of tool holder assemblies each for holding at least one tool;

a tool post secured to and disposed stationary relative to said cross slide for movement therewith and for holding any one of said tool holder assemblies carrying a tool for operation on said workpiece;

a tool magazine for carrying tool holder assemblies and mounted on said cross slide for movement to bring any one of said tool holder assemblies into a ready position aligned with said tool post, said tool post being spaced from said tool magazine;

tool holder assembly transport means having a rod reciprocable along a line between said ready position and said tool post, and having means on said rod engageable with one of said tool holder assemblies when disposed in said ready position for moving said one tool holder assembly between said ready position and said tool post;

said tool magazine having an annular guide channel extending around substantially the entire circumference thereof and having an opening therein in alignment with said ready position;

each said tool holder assembly having at least one roller disposed in said guide channel for movement therethrough and mounted to said tool holder assemblies for maintaining them in fixed radial alignment during movement around said channel; and said engageable means on said rod of said transport means including a segment of channel alignable with said guide channel, in said ready position so as to form a continuous channel therewith through which said rollers travel and which segment of channel is displaceable with said engageable means from said ready position to said tool post with said rollers of a tool holder assembly disposed in said segment.

13. A tool changing and supporting apparatus as defined in claim 12, wherein said engageable means includes:

a shuttle member secured to said rod for movement between said ready position and said tool post in a direction substantially radially outward from said magazine.

14. A tool changing and supporting apparatus as defined in claim 13, including:

a guide channel section fixed to said cross slide and extending between said ready position of said magazine and said tool post for guiding said engageable means and a tool holder assembly therebetween.

15. A tool changing and supporting apparatus as defined in claim 14, wherein said guide channel means includes guide rails and said engageable means has corresponding channels formed therein for guiding said engageable means between said ready position and said tool post.

* * * * *